(12) United States Patent
Kokaram (10) Patent No.: US 8,229,174 B2
(45) Date of Patent: *Jul. 24, 2012

(54) TECHNIQUE FOR ESTIMATING MOTION AND OCCLUSION

(75) Inventor: Anil Christopher Kokaram, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,496

(22) Filed: Oct. 31, 2011

(65) Prior Publication Data

US 2012/0044998 A1 Feb. 23, 2012

Related U.S. Application Data

(63) Continuation of application No. 11/813,464, filed as application No. PCT/IE2006/000001 on Jan. 5, 2006, now Pat. No. 8,064,644.

(30) Foreign Application Priority Data

Jan. 6, 2005 (GB) .................................... 0500174.8

(51) Int. Cl.
*G06K 9/00* (2006.01)
*H04N 11/02* (2006.01)
(52) U.S. Cl. ...................... 382/107; 382/291; 375/240.1
(58) Field of Classification Search .................. 382/100, 382/103, 106, 107, 162, 168, 170, 171, 173, 382/181, 190–201, 232, 254, 274, 276, 282, 382/291, 295, 305, 312, 236; 375/240.1, 375/240.4, 240.5, 240.27, 240.16
See application file for complete search history.

(56) References Cited

U.S. PATENT DOCUMENTS 6,438,170 B1   8/2002 Hackett et al.
6,466,624 B1 * 10/2002 Fogg ......................... 375/240.27
6,487,313 B1 * 11/2002 De Haan et al. .............. 382/236
(Continued)

FOREIGN PATENT DOCUMENTS

EP          0477616 A3    4/1992
(Continued)

OTHER PUBLICATIONS

A.C. Kokaram. Motion Picture Restoration: Digital Algorithms for Artefact Suppression in Degraded Motion Picture Film and V deo. Spr nger Ver ag, SBN 3-540-76040-7, pp. 13-46. 1998.*

(Continued)

*Primary Examiner* — Seyed Azarian
(74) *Attorney, Agent, or Firm* — Young Basile Hanlon & MacFarlane, P.C.

(57) ABSTRACT

A method and apparatus for estimating motion and occlusion is disclosed. In one aspect, a method of estimating motion and occlusion between three or more frames in a video stream includes identifying a plurality of motion vector candidates for each of a forward direction and a backward direction, generating a plurality of candidate pairs, determining an energy for at least some of the plurality of candidate pairs using a processor by jointly evaluating the forward motion vector and the backward motion vector of at least some of the plurality of candidate pairs based on interframe difference, spatial motion correlation, temporal motion correlation, and spatial occlusion correlation, and estimating motion and occlusion between the three or more frames by selecting a candidate vector from the plurality of candidate vectors based on the determined energies.

20 Claims, 4 Drawing Sheets

Frame n-1

Frame n

Frame n+1

U.S. PATENT DOCUMENTS

| | | | |
|---|---|---|---|
| 7,085,401 B2 * | 8/2006 | Averbuch et al. | 382/103 |
| 7,343,044 B2 * | 3/2008 | Baba et al. | 382/236 |
| 7,697,769 B2 * | 4/2010 | Baba et al. | 382/236 |

FOREIGN PATENT DOCUMENTS

| | | |
|---|---|---|
| WO | 9922520 | 5/1999 |
| WO | 2004082294 A1 | 9/2004 |

OTHER PUBLICATIONS

J. Besag. On the statistical analysis of dirty pictures. Journal of the Royal Statistical Society B, 48:259-302, 1986.

M.J. Black and P. Anandan. A framework for the robust estimation of optical flow. In Fourth International Conf. on Computer Vision, pp. 231-236, May 1993.

P. Bouthemy, M. Gelgon, and F Ganansia. A unified approach to shot change detection and camera motion characterization. IEEE Transactions on Circuits and Systems for Video Technology, 9:1030-1044, 1999.

H. Denman, N. Rea, and A. Kokaram. Content based analysis for video from snooker broadcasts. In International Conference on Image and Video Retrieval CIVR2002, Jul. 18-19, 2002.

D.P. Elias and N.G. Kingsbury. An efficient block segmentation algorithm for true motion estimation. In Sixth IEEE International Conference on Image Processing and Its Applications, vol. 1, pp. 209-213. IEEE Conference Publications 443, Jul. 14-17, 1997.

M. Ghanbari. The cross-search algorithm for motion estimation. IEEE Transactions on Communication, 38:950-953, Jul. 1990.

H. Higgins. The interpretation of a moving retinal image. Proceedings of the Royal Society, London, B 208:385-397, 1980.

B. Horn and B. Schunck. Determining optical flow. Artificial Intelligence, 17:185-203, 1981.

D.M. Martinez. Model-based motion estimation and its application to restoration and interpolation of motion pictures. PhD thesis, Massachusetts Institute of Technology, 1986.

J. Biemond, L. Looijenga, D.E. Boekee, and R.H.J.M. Plompen. A pel-recursive Wiener-based displacement estimation algorithm. Signal Processing. 13:399-412,1987.

L. Boroczy, J.N. Driessen, and J. Biemond. Adaptive algorithms for pel-recursive displacement estimation. In Proceedings SPIE VCIP, pp. 1210-1221, 1990.

H. Higgins. The visual ambiguity of a moving plane. Proceedings of the Royal Society, London, B 223:165-175, 1984.

V. Seferidis and M. Ghanbari. Heirarchical motion estimation using texture analysis. In IEEE 4th Conference on Image Processing, pp. 61-64, 1992.

M. Bierling. Displacement estimation by heirarchical block matching. In SPIE VCIP, pp. 942-951, 1988.

A.C. Kokaram. Motion Picture Restoration: Digital Algorithms for Artefact Suppression in Degraded Motion Picture Film and Video. Springer Verlag, ISBN 3-540-76040-7, pp. 13-46. 1998.

A. Murat Tekalp. Digital Video Processing. pp. 72-94, 177-197. Prentice Hall, 1995.

A. Zaccarin and B, Liu. Fast Algorithms for Block Motion Estimation. In IEEE ICASSP, vol. 3, pp. 449-452, 1992.

Patent Cooperation Treaty Written Opinion of the International Searching Authority and International Search Report for International Application No. PCT/IE2006/000001 mailed on Aug. 2, 2006.

Kokaram. "On Missing Data Treatment for Degraded Video and Film Archives: A Survey and a New Bayesian Approach", IEEE Transactions on Image Processing, vol. 13, No. 3, pp. 397-415, 2004.

Kokaram, et al. "Automated Rig Removal with Bayesian Motion Interpolation", IEEE Conference Publication; 1st European conference on Visual Media Production, pp. 155-164, 2004.

Black, et al. "Robust Dynamic Motion Estimation Over Time", IEEE Computer Society Conference on Computer Vision and Pattern Recognition, pp. 296-302, 1991.

Kokaram, et al. "A System for Reconstruction of Missing Data in Image Sequences Using Sampled 3D AR Models and MRF Motion Priors", Computer Vision—ECCV '96. 4th European Conference on Computer Proceedings, vol. 2, pp. 613-624, 1996.

Kelly, et al. "Graphics Hardware for Gradient Based Motion Estimation", Proceedings of SPIE—IS&T Electronic Imaging, vol. 5309, No. 1, pp. 92-103, 2004.

* cited by examiner

| 1 | 7 | 11 | 2 | 8 | 12 | 3 |
|---|---|---|---|---|---|---|
| 15 | 21 | 25 | 16 | 22 | 26 | 17 |
| 29 | 32 | 34 | 30 | 33 | 35 | 31 |
| 4 | 9 | 13 | 5 | 10 | 14 | 6 |
| 18 | 23 | 27 | 19 | 24 | 28 | 20 |

Figure 8:

TECHNIQUE FOR ESTIMATING MOTION AND OCCLUSION

CROSS-REFERENCE TO RELATED APPLICATIONS

The present application is a Continuation Application of U.S. application Ser. No. 11/813,464, filed Jan. 25, 2008, which application is a U.S. National Stage Application of PCT Application No. PCT/IE06/000001, filed Jan. 5, 2006, which application claims priority to Great Britain Application No. 0500174.8 filed Jan. 6, 2005, all of which are incorporated herein by reference.

BACKGROUND

The determination of motion from an image sequence is currently employed for a wide variety of tasks. For instance, in video coding the MPEG and H.261/2/3 standards employ motion information in order to efficiently compress image sequence data. The idea is that generally image content does not change substantially between frames in any interesting image sequence, excepting for motion. Thus if it were possible to transmit one frame at the start of a scene, and then simply send the motion information for subsequent frames instead of the actual picture material, then all the subsequent frames in that scene could be built at the receiver. The various MPEG and H.26x standards exploit this idea and in practice stipulate an allowable maximum amount of frames over which such motion compensated prediction is possible. It is because of video coding in particular that motion estimation has been widely studied and is of industrial importance.

Motion estimation is also useful for a number of video content retrieval tasks e.g. shot cut detection [6] and event detection [7]. It is also vital and heavily used for reconstructing missing images, deinterlacing, and performing sequence restoration tasks in general [20, 15].

The Block Matching motion estimation algorithm is perhaps the most popular estimator and numerous variants have been proposed in the scientific [18, 3, 21, 10] and patent literature [19, 9, 17] from as early as 1988. The general idea is to assume that blocks of pixels (16×16 in the MPEG2 standard, and optionally 8×8 in the MPEG 4 standard) contain a single object moving with some simple and single motion. An exhaustive search in the previous and/or next frames for the best matching block of pixels of the same size, then yields the relevant motion vector.

Figure 1:
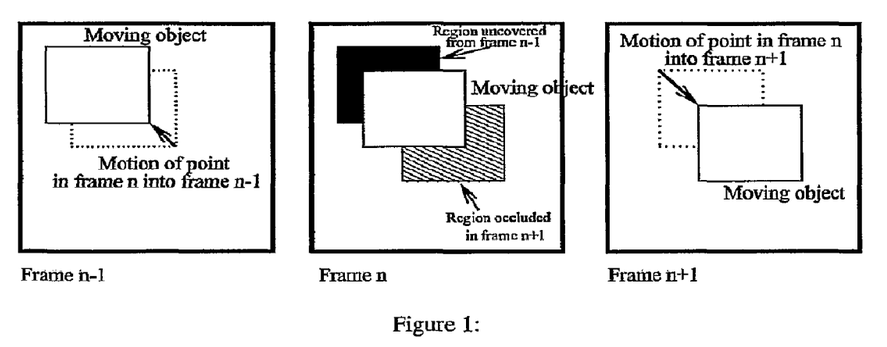
FIG. 1: The three frames n−1, n, n+1 are shown with a single square object translating across the images. Dark regions are shown in frame n (the current frame) which are occluded in frame n+1, and uncovered from frame n−1. It is this effect that the state s incorporates. The motion undergone by the object is also indicated as a vector in frame n−1 and frame n+1. This invention estimates and refines the motion from the current frame into the previous (n−1) and next (n+1) frames.

Of course motion in an image sequence does not necessarily obey the block matching assumption. Typically at the boundaries of moving objects, blocks will contain two types of pixels. Some will be part of the moving object, while others will be part of another moving object or a stationary background. This situation is shown in FIG. 1. While this does not affect the use of block matching for video coding very much, it does have an implication for image manipulation e.g. restoration, deinterlacing, enhancement. In those applications processing blocks at motion boundaries without acknowledging the motion discontinuity causes poor image quality at the output sometimes giving the effect of dragging or tearing at moving object boundaries. One method for solving this problem is to split blocks at such boundaries e.g. as proposed in [8]. De Haan et al [17] propose an invention that also describes one such variant of that idea.

As early as 1981 [14, 13, 12] it was recognised that having a motion vector for every pixel in an image might overcome this problem. Various schemes have since then been proposed to do this based typically on some image gradient observations and the incorporation of the notion that motion in a local area of the image should be smooth in some sense. These are typically iterative methods and the result is a motion vector for every pixel in the image, yielding what is called the optical flow for an image. However, although estimating a vector for every pixel does overcome the problem somewhat, there is still no notion in determining optical flow of whether that pixel exists in future or previous frames i.e. there is no understanding of occlusion.

In some sense, occlusion estimation is related to allowing for motion discontinuities at the boundaries of moving objects. Since 1993 (Black et al [4]) this idea has been pursued in that way. Motion discontinuity estimation is now widely accepted to be a vital piece of information required to assist image manipulation tasks in general. For instance, in [11] an invention is described that uses a block splitting method to aid deinterlacing of video by extracting motion discontinuity information.

SUMMARY

This invention is novel in the following aspects:

It provides a single process for unifying the estimation of motion with the direct and explicit estimation of occlusion. (Unlike inventions [19, 9, 17] which are specifically targeted at motion (and not occlusion)).

It allows for motion information from any motion estimator (block matching or otherwise) to be refined to output motion and occlusion information. In the preferred embodiment a gradient based estimator is used. In [19] a refinement process is proposed which results only in motion information, and which uses block matching. None of the previous work proposes any such refinement idea.

It allows unimportant objects to be ignored in estimation. This is important particularly for the motion picture post production industry in which it is often the case that users will already know the position and extent of objects to be ignored. None of the previous work allows for this situation.

It allows the information to be created at pixel resolution. (Unlike inventions [19, 9, 17] which are specifically targeted at the block resolution).

It exploits a pyramid of successively coarser resolution images to allow for larger ranges of motion. None of the previous work incorporates this idea.

BRIEF DESCRIPTION OF THE DRAWINGS

FIG. 7: Three frames n−1, n, n+1 are shown, represented as 1-dimensional strips of 13 pixels for clarity. An object that is 4 pixels long (shown as a dark set of pixels) is moving by 2 pixels per frame across the three frame sequence. The figure makes clear the relationship between pixel positions and the motion vectors $d_{n,n-1}, \ldots$ both forward and backward in time. The invention estimates $d_{n,n+1}, d_{n,n-1}$ given all other motion information shown. The figure also indicates that the temporal prior compares $d_{n,n-1}(x)$ with $d_{n-1,n}$ at the displaced location $x+d_{n,n+1}$. These two vectors should match (be mirror reflections of each other) if no occlusion is occurring. The alternative prior configuration can also be identified in the figure as well. In that alternate case, $d_{n,n+1}$ is compared with $d_{n+1,n+2}$.

DETAILED DESCRIPTION

Define the current image under consideration as frame n, then the previous image is indexed with n−1 and the next with n+1. A pixel at a site h, k (i.e. column h, and row k) in frame n has a value that is denoted as $I_n$ (h,k). This can also be expressed as $I_n$ (x) where x=[h, k] is the position vector indicating a pixel at site h, k. To understand the outputs of the invention, it is sensible to state an initial image sequence model as follows.

$$I_n(x)=I_{n-1}(x+d_{n,n-1}(x))+e_n^b(x) \quad (1)$$

$$I_n(x)=I_{n+1}(x+d_{n,n+1}(x))+e_n^f(x) \quad (2)$$

In the first equation, the current pixel $I_n(x)$ is shown to be the same as a pixel in the previous frame n−1 except at another location, and with some added noise $e_n^b(x)$. That location is x offset by the motion at that site $d_{n,n-1}(x)=[d_h, d_k]$. Here $d_h$ is the horizontal component of motion while $d_k$ is the vertical. The second equation is the same except relating the current pixel to a pixel in the next frame. See FIG. 7 for a clarifying illustration of the various vector terms used.

These two equations simply state that the current image can be created by rearranging the positions of pixels from the previous OR the next frames. They are the basis for all known block matching algorithms, and most known optical flow algorithms. In fact, the situation is more complicated than that. In some situations, an object will cover the current pixel in the next frame. Then equation (2) would not be valid because the current pixel will not exist in the next frame. Similarly, a pixel in the current frame may have been revealed by an object moving away from that site in the previous frame. In that case equation (1) becomes invalid.

The invention therefore estimates four quantities at each site x. The first two quantities are the forward and backward motion $d_{n,n+1}(x)$, and $d_{n,n-1}(x)$ respectively. The last two are occlusion indicators. These are two quantities $O_b(x)$, $O_f(x)$ which indicate the extent to which the site x is covered or revealed in the next, or, from the previous frames. They have a maximum value of 1 and a minimum value of 0. Being set to 1 indicates that the pixel does NOT exist in the relevant frame, while set to 0 means that the pixel DOES exist in the relevant frame. When $O_b$ is set to 1 for instance, this means that the pixel does not exist in the previous frame. When $O_f$ is set to 1, this means that the pixel does not exist in the next frame. These quantities are therefore indicators of occlusion, value close to one indicate occluded pixels, while close to zero indicate valid motion. In the preferred embodiment of this invention these indicators are binary, however this need not be the case. FIG. 1 explains how occlusion occurs in a sequence.

For simplicity at each site the two occlusion variables can be combined into a single variable $s=O_b, O_f$. This state variable s can be interpreted as follows.

s=00: There is no occlusion in either the previous or next frames and so both equations for motion, (1) and (2), are valid and the pixel exists in all frames.

s=10: There IS occlusion in the previous frame and so the pixel only exists in the current and next frames. Only equation (2) is valid.

s=01: There IS occlusion in the next frame and so the pixel only exists in the current and previous frames. The equation (1) is valid.

s=11: There IS occlusion in both next and previous frames. This cannot be true in any normally behaving image sequence. For it to occur there must be something wrong with the image data. A classic case occurs when the current image data is missing, e.g. due to digital data dropout in transmission or image damage in film (blotches and line scratches [15]).

Figure 3:
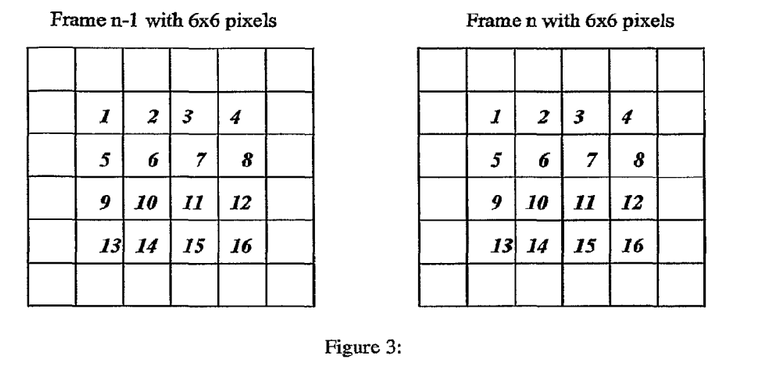
FIG. 3: Two frames of 6×6 pixels are shown in which a central block of 5×5 pixels is being used for estimating motion. The sequence is the site indexing required (using raster scan) to create the vector z and gradient matrix G. Thus inter image differences are read out into z and gradients are read out into G.

In order to handle large values of motion and to improve the convergence of the overall process it is preferable to operate on a multiresolution basis. Therefore firstly, for each image $I_{n-1}, I_n, I_{n+1}$, a pyramid of L images are created by low pass filtering and then downsampling the original image L times. This is shown as block (1) in the overall process in FIG. 3. Thus for image $I_n$ for instance, of size M×N rows and columns, successively smaller images are created of size (M/2)× (N/2), (M/4)×(N/4), (M/8)×(N/8) and so on, up to (M/($2^L$))× (N/($2^L$)). This situation is illustrated in FIG. 1. The preferred low pass filter is a separable Gaussian filter with a size of P taps. The filter coefficients g[h] are given by the equation below $$g[h] = \exp-\left(\frac{(h-(P/2))^2}{2\sigma_g^2}\right) \quad (3)$$

and the parameters of the filter are P and $\sigma_g^2$. h refers to one the P filter taps with range 0 . . . P−1. $\sigma_g^2$ controls the amount of smoothing. Larger values yield more smoothing. In this invention values of $\sigma_g^2=1.5^2$, and P=9 are preferred. Note that g[h] is normalised before use as a filter, so that $\Sigma_{h=0}^{h=8} g[h] = 1$. The motion estimation and refinement process then begins at the coarsest level L. Level 0 is the original resolution image. Then estimates are propagated and refined at successively higher resolutions until the final output at level 0 results.

1.1 Initialisation

The invention takes as input a set of motion vectors from any previous motion estimation step. These vectors may be specified on either a block basis or a pixel basis. In a preferred embodiment a gradient based block motion estimator is used. This step is indicated as block (2) in the overall process in FIG. 3.

For this part the invention uses mathematical methods described in ?. Given a block size of B×B pixels, and an initial estimate for motion $d^0$ (which may be zero), the goal is to update the initial estimate to generate the correct motion d. It is possible to estimate that update u such that $d=d^0+u$. The subscripts $\bullet_{n,n-1}$ etc are dropped for simplicity. Consider equation (1) (the situation is the same for the forward motion in equation (2)). This equation can be linearised by substituting for u and expanding the right hand term $I_{n-1}(x+d(x))$ as a Taylor series about $d^0$. The linearised equation at each pixel site can be collected for the entire block to yield the following solution.

$$u = \left[G^T G + \mu \begin{bmatrix} 1 & 0 \\ 0 & 1 \end{bmatrix}\right]^{-1} G^T z \quad (4)$$

z is a vector (of size) that collects displaced pixel differences at each pixel site in the block scanned in a raster fashion as follows $$z = \begin{bmatrix} I_n(x_1) - I_{n-1}(x_1 + d^0) \\ I_n(x_2) - I_{n-1}(x_2 + d^0) \\ I_n(x_3) - I_{n-1}(x_3 + d^0) \\ I_n(x_4) - I_{n-1}(x_4 + d^0) \\ \vdots \end{bmatrix} \quad (5)$$

G is a matrix (of size $B^2 \times 2$) containing the horizontal $g_x(\bullet)$ and vertical gradients $g_y(\bullet)$ at each pixel site in the block (in the frame n−1) scanned in a raster scan fashion. These gradients are estimated using pixel differencing, thus $g_x(h,k)=0.5(I_{n-1}(h+1, k)-I_{n-1}(h-1, k))$ and $g_y(h,k)=0.5(I_{n-1}(h, k+1)-I_{n-1}(h, k-1))$. The matrix is then defined as follows.

$$z = \begin{bmatrix} g_x(x_1) & g_y(x_1) \\ g_x(x_2) & g_y(x_2) \\ g_x(x_3) & g_y(x_3) \\ g_x(x_4) & g_y(x_4) \\ \vdots \end{bmatrix} \quad (6)$$

In [2], μ is related to the noise $e(\bullet)$ in equation 1. In this invention it is configured differently as disclosed The sequence for scanning measurements to create z and G is shown in FIG. 3.

In practice, one iteration is not enough to update the initial estimate to the correct motion d. Instead, the update is used to create a new estimate $d=u+d^0$ and that in turn is recursively used as the new initial estimate for further updating. The process is therefore iterative, and converges to a solution after a certain number of iterations T. The recursive procedure is terminated when any one of the following stopping criterion is true Iterations exceed the maximum allowed. $T_{max}=20$ is preferred.

The sum squared prediction error $\|z\|=z^T z$ is below a threshold $z_t$. Two options are preferred for setting this threshold, $z_t=B^2 \times 4$ works for many applications, and also the threshold can be estimated adaptively (disclosed later). This adaptivity has not been presented previously.

There is no significant gradient in the block under consideration in the previous frame.

$\|u\| < u_t$, where $u_t=0.01$ is preferred.

At each iteration, the new estimate for motion may be fractional. In that case bilinear interpolation is used to retrieve the pixels at the off grid locations in the previous frame.

1.1.1 Adaptivity for μ

The term μ is more correctly identified as a regularising term which makes $G^T G$ invertible and also controls the rate of convergence of the solution. In [5] a recipe for adapting μ to the conditioning of $G^T G$ is given and this is used in this invention. However, when $G^T G$ is ill conditioned, this may be a symptom of either low gradient, or there is a dominant edge in the block. It is well known that motion cannot be accurately estimated in the direction parallel to an edge. [5] does not address this issue. In [16] a recipe for addressing this problem is presented, however the solution there is not recursive and does not incorporate any of the good convergence properties of equation 4. By combining these ideas together, a new adaptation for μ can be proposed.

The essence of this new adaptation is to measure the ill-conditioning in $G^T G$ and then select either the regularised solution disclosed above, or use Singular Value Decomposition in the case of ill-conditioning. This is the adaptation used in this invention. Therefore, at each iteration the motion update is estimated as follows.

$$u = \begin{cases} \alpha_{max} e_{max} & \text{if } \frac{\lambda_{max}}{\lambda_{min}} > \alpha \\ [G^T G + \mu I]^{-1} G^T z & \text{otherwise} \end{cases} \quad (7)$$

$$\mu = |z| \frac{\lambda_{max}}{\lambda_{min}} \text{ if } \frac{\lambda_{max}}{\lambda_{min}} \leq \alpha \quad (8)$$

$$\alpha_{max} = \frac{e_{max}^T}{\lambda_{max}} G^T z$$

$\lambda_{max}, \lambda_{min}$ are the max and min eigen values of $G^T G$. $e_{max}^T$ is the eigen vector corresponding to the eigen value $\lambda_{max}$. α is a threshold on the allowable ill-conditioning in the matrix $G^T G$. The preferred value is 100.0 f. It is α that allows the selection of the two different updating strategies.

Note that the same situation exists for forward and backward motion estimation.

1.1.2 Adaptive Choice for $z_t$

The threshold $z_t$ determines which blocks are detected to contain moving objects or not. Assuming that most of the image contains pixels that are not part of moving objects, then by calculating the interframe difference for no motion most of the sites can contribute to an estimate of $z_t$. The steps are as follows to calculate $z_t$ for estimating motion between the current and previous frame pair.

1. Calculate $\epsilon(x)=[I_n(x)-I_{n-1}(x)]^2$ at each site x in frame n.
2. Create a histogram of these values using bins of 0 ... 255 in unit steps.
3. Reject those sites constituting the upper P % of the histogram. P=60 is a suitable conservative value.
4. For those remaining sites calculate the mean value of $\epsilon(x)$, $\hat{\epsilon}$.
5. Set $z_t = B^2 \times \hat{\epsilon}$ In this invention block sizes vary depending on the size of the image. For an image of size 1440×1152, the preferred B=16, for 720×576, B=9, for 360×288 B=9, for 144×288 B=5, and for all smaller resolutions the same.

1.1.3 Pixel Assignment

The previous steps result in a motion vector per image block. To initialise each pixel with a motion vector, the block vector has to be assigned to individual pixels. This is done for each block with the steps as below 1. A set of 9 candidate vectors are selected for a block. These candidates are collected from the current block, and its eight nearest neighbours.
2. The candidates are then pruned to remove repeated vectors, or vectors which are within 0.1 pixels of each other in length. Denote the pruned candidate vector as $v_c$ where there are C candidates in all.
3. For each pixel in the block, the prediction error for each candidate $|I_n(x)-I_{n-1}(x+v_c)|$ is measured.
4. The vector candidate yielding the lowest prediction error is used as the assigned vector for this site.

The same process is used for forward motion assignment. Note that a simpler assignment process is to just repeat the block based vector for all pixels in the block. That idea does work, but sometimes results in more iterations required in the next and final step. The preferred process is the candidate selection disclosed here. This is shown as block (5) in the FIG. 3.

1.2 Motion and Occlusion Estimation

Given initial estimates for motion from any prior motion estimation step at a particular resolution level L, the task now is to incorporate new constraints in order to estimate the true motion information. Consider a single site x in frame n. It is required to estimate $d_{n,n-1}, d_{n,n+1}, O_b, O_f$ at that site. Note that the position argument has been dropped for simplicity. Proceeding in a probabilistic fashion, it is required to manipulate $p(d_{n,n-1}, d_{n,n+1}, s | D^-, S^-, I_n, I_{n-1}, I_{n+1})$. Here $D^-, S^-$ denote the state of the pixel sites in terms of motion and occlusion at the pixels in the neighbourhood of the size x, but NOT including the site x itself. This neighbourhood may also include pixels in the previous and next frames. In other words, it is required to manipulate the probability distribution of the unknowns (motion, occlusion) GIVEN the motion, occlusion data at the pixel sites around and image data in the current, previous and next frames.

Using Bayes' theorem the p.d.f may be expressed as a combination of a likelihood and a number of priors which incorporate various known properties of motion and occlusion fields.

$$p(d_{n,n-1},d_{n,n+1},s|D^-,S^-,I_n,I_{n-1},I_{n+1}) \propto p(I_n,I_{n-1},I_{n+1}| \\ d_{n,n-1},d_{n,n+1},s) \times p(d_{n,n-1},d_{n,n+1}|D^-) \times p(s|S^-) \quad (9)$$

To use this expression, suitable functional forms have to be designed for each of the terms above. These are disclosed below.

1.2.1 The Likelihood

The connection between the variables and the image data is given directly from equations (1), (2) and the statements about occlusion given earlier. The expression is as follows and assumes that e(x) is a sample from a Gaussian distribution with mean 0 and variance $\sigma_e^2$.

$$p(I_n, I_{n-1}, I_{n+1} | d_{n,n-1}, d_{n,n+1}, s) \propto \quad (10)$$

$$\begin{cases} \exp-\left(\frac{[I_n(x)-I_{n-1}(x+d_{n,n-1})]^2 + [I_n(x)-I_{n+1}(x+d_{n,n+1})]^2}{2\sigma_e^2}\right) & s=00 \\ \exp-\left(\frac{[I_n(x)-I_{n-1}(x+d_{n,n-1})]^2}{2\sigma_e^2} + \beta\right) & s=01 \\ \exp-\left(\frac{[I_n(x)-I_{n+1}(x+d_{n,n+1})]^2}{2\sigma_e^2} + \beta\right) & s=10 \\ \exp-(2\beta) & s=11 \end{cases}$$

Here $\beta$ acts as a hypothesis check on outliers in the gaussian distribution for the displaced pixel difference e(x). $\beta=2.76^2$ gives a 90% chance that occlusion will be selected when that error exceeds $2.76^2 \times 2\sigma_e^2$.

This expression encodes the notion that when there is no occlusion, the current and next or previous pixels, compensated for motion, should be similar.

1.2.2 Spatial Smoothness

The first piece of prior information to be encoded is the fact that in a local region of pixels, it is expected that the occlusion state s and the motion field d should be smooth. A Markov random field is used to encode this idea. The spatial smoothness prior for backward motion is the same as for forward motion and is as follows.

$$p(d_{n,n-1}|D^-) \propto \exp-\left(\Lambda \sum_{p_j \in N, j=1:8} \lambda_j f(|d_{n,n-1} - d_{n,n-1}(p_j)|)\right) \quad (11)$$

Figure 5:
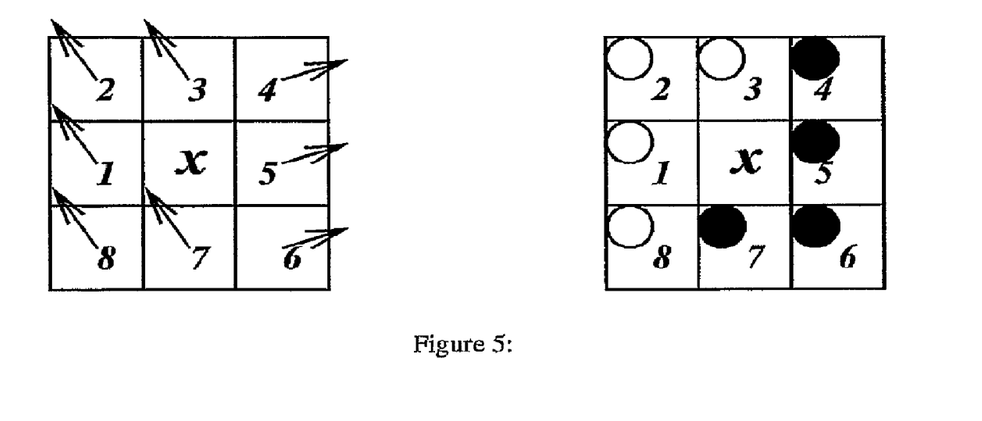
FIG. 5: The relationship between the current site x and its neighbours $p_j$:j=1:8 is shown. On the left a representative vector neighbourhood is shown, while on the right a representative occlusion state s neighbourhood is shown. The occlusion states are shown as circles that are either clear or dark indicating some value of s. This neighbourhood configuration is used in calculating the various spatial smoothness energies indicated in the description of this invention.

Here the vectors $p_j$ are taken from the 8 nearest neighbour sites to x(N), the site under consideration. $\lambda=1$ for the neighbourhood sites on the vertical and the horizontal, and $1/\sqrt{2}$ for the 4 diagonal neighbourhood sites. $\Lambda$ controls the overall smoothness strength that is applied. $\Lambda=2.0$ is preferred. This prior essentially penalises the estimated motion from being significantly different from its neighbours. See FIG. 5 for clarification of the spatial relationship between the current site x and its neighbourhood.

The function $f(\bullet)$ allows for motion discontinuities by encoding the idea that either the motion field is generally so smooth that the vectors are the same, but where they are different they are very different. Many different robust functions may be used here, e.g. Huber's function, Tukey's function. Here a simple robust function is preferred which is as follows $$f(|d_{n,n-1} - d_{n,n-1}(p_j)|) = \\ \begin{cases} |d_{n,n-1} - d_{n,n-1}(p_j)| & \text{for } |d_{n,n-1} - d_{n,n-1}(p_j)| < v_t \\ v_t & \text{otherwise} \end{cases} \quad v_t=5,$$

and $|\bullet|$ is the Euclidean distance between two vectors.

In another alternate form for $f(\bullet)$ an explicit image edge detector may be used e.g. Canny or any zero crossing edge detector. When an edge is detected between a pair of vectors in the calculation above, the output is 0. In cases where there is no edge, the output is the usual Euclidean distance. This idea allows motion across an image edge to be independent, and assumes that motion edges are likely to occur at image edges.

In a similar way a spatial smoothness constraint on the occlusion field s can be configured as follows.

$$p(s \mid S^{-1}) \propto \exp -\left(\Lambda \sum_{p_j \in N, j=1:8} \lambda_j(s \neq s(p_j))\right) \quad (12)$$

In this case the occlusion configuration at the current site is encouraged to be similar to the configuration at sites in the neighbourhood. See FIG. 5 for clarification of the spatial relationship between the current site x and its neighbourhood.

1.2.3 Temporal Smoothness

Another observation typically made about any motion in a real image sequence is that the motion is smooth in time, except when there is occlusion. See FIG. 7 for a clarification. There are several ways to encode this notion mathematically. The simplest is to employ already existing estimates for motion in the previous and next frames as follows.

Figure 7:
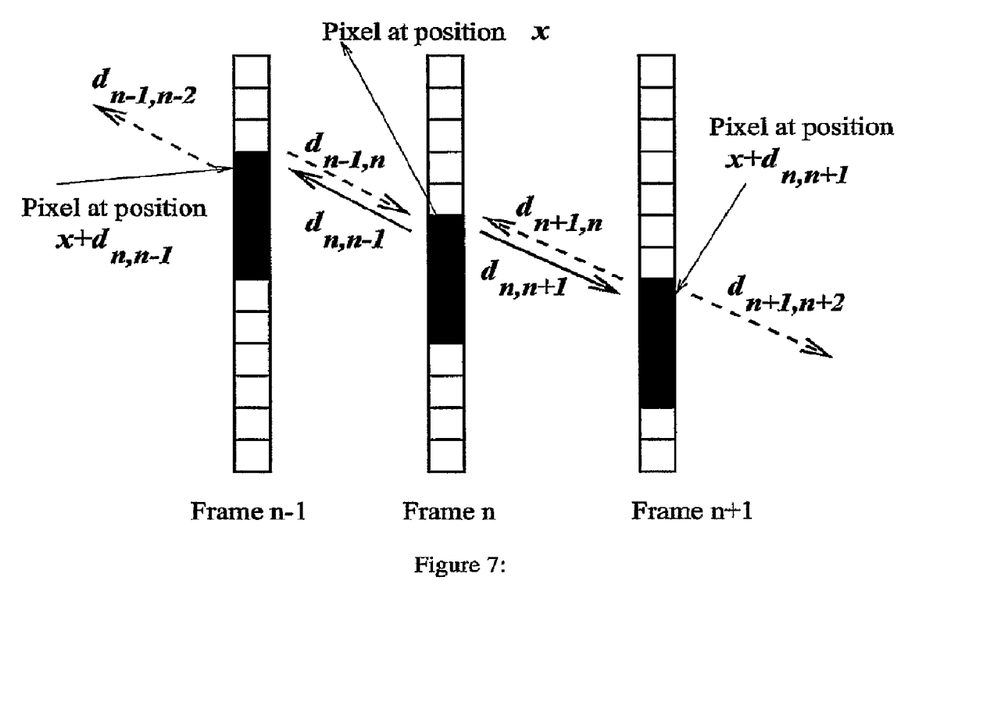

$P_t(d_{n,n-1} \mid D^-) \propto$ $$\begin{cases} \exp-\left(\frac{1}{2\sigma_d^2}[\,|d_{n,n-1}+d_{n-1,n}(x+d_{n,n-1})|^2 + |d_{n,n+1}+d_{n+1,n}(x+d_{n,n+1})|^2\right) & s = 00 \\ \exp-\left(\frac{1}{2\sigma_d^2}|d_{n,n-1}+d_{n-1,n}(x+d_{n,n-1})|^2 + \beta_1\right) & s = 01 \\ \exp-\left(\frac{1}{2\sigma_d^2}|d_{n,n+1}+d_{n+1,n}(x+d_{n,n+1})|^2 + \beta_1\right) & s = 10 \end{cases} \quad (13)$$

This expression encourages vectors to agree between frames. Thus, provided there is no occlusion, the motion between n and n−1 for instance, should be the same as the motion between n−1 and n. The state s=11 is not allowed here. The temporal relationship between the motion vectors used here is indicated in FIG. 7.

This prior may be configured in another fashion by comparing $d_{n,n-1}$ with $d_{n-1,n-2}$ (and similar for $d_{n,n+1}$) for brevity this is not explicitly stated here. However this alternate prior can be constructed by replacing $d_{n-1,n}$ with $d_{n-1,n-2}$ and replacing $d_{n+1,n}$ with $d_{n+1,\,n+2}$ in the expression above. In practice the expression above is preferred but there are situations in which the alternate expression may be suitable e.g. in the case where the current frame is missing for some reason. Typically $\beta_1 = \beta$, and $\sigma_d^2 = 2.0$. $\sigma_d^2$ controls the match between motion that is expected in time. A large value tolerates very poor matches.

1.3 The Final Algorithm

Figure 4:
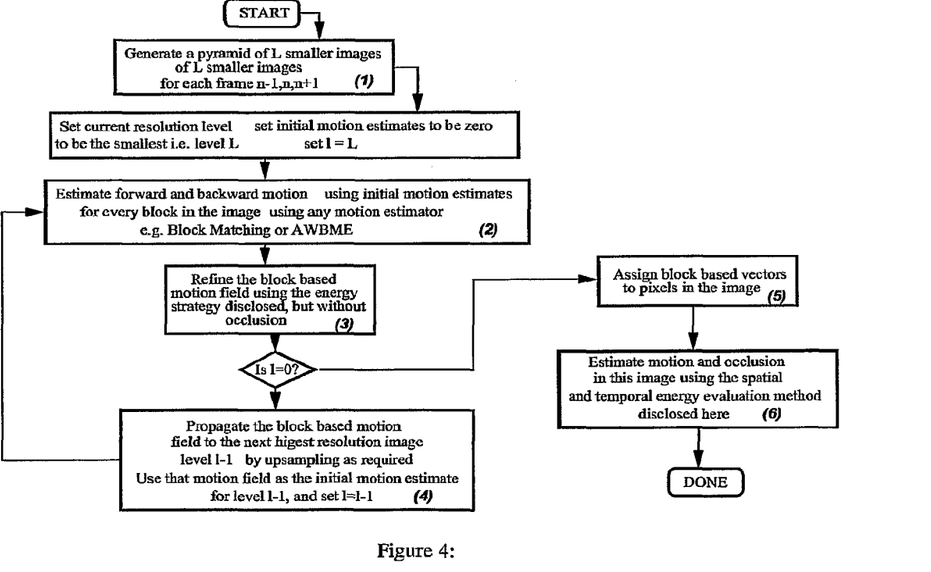
FIG. 4: The preferred overall motion estimation and motion/occlusion refinement process is shown. Block (3) is preferred but optional.

The problem is highly non-linear. However, the key idea is to recognise that given existing estimates for motion, the correct motion estimate already exists somewhere in the image. This implies then that a solution can be generated by combining the Iterated Conditional Modes algorithm of Besag [1] with a candidate selection process. In essence, the final algorithm proceeds by selecting a subset of vectors from the surrounding region in time and space, then evaluating each of these vectors using the expression in equation 9 and combining it with occlusion. The candidate with the best probability is selected for the current site, and then the next site is visited. Since all the candidates are being substituted into the same expression, using the log probability removes the need to calculate exponentials. Furthermore, maximising probability is then the same as minimising the log probability, therefore the evaluation process is simplified extensively. This step is shown as block (6) in FIG. 4.

1. A set of initial candidates for motion are created by using the motion at the current site x and the 8 nearest neighbours. In addition another candidate can be generated by selecting the vector that occurs the most in a block of $B_1 \times B_1$ pixels around the current site. Here $B_1 = 64$ is sensible. This yields 10 candidates.

Figure 6:
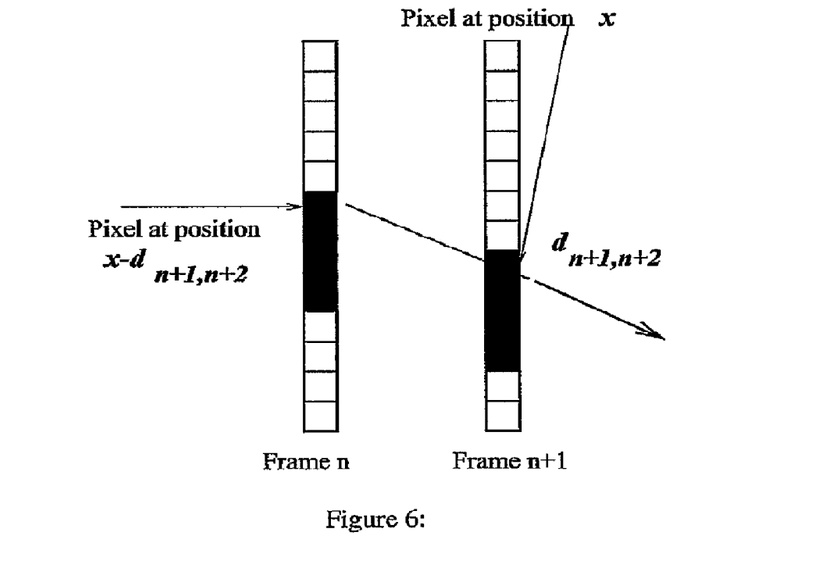
FIG. 6: The two frames n, n+1 are shown, represented as 1-dimensional strips of 13 pixels for clarity. An object that is 4 pixels long (shown as a dark set of pixels) is moving by 2 pixels per frame. The use of the motion between n+1, n+2 to create a candidate for motion in the current frame n is shown. In effect, all the motion in n+1 is backprojected along their own directions and wherever they hit in the current frame n, a temporal candidate is found for that site. The example shows $d_{n+1,n+2}(x)$ being backprojected to hit the site $x-d_{n+1,n+2}(x)$. Of course it is unlikely that the hits will occur on the integer pixel grid, and in that case, the hit is assigned as a candidate to the nearest rounded pixel location.

Finally a set of additional candidates can be generated by projecting vectors from the previous or next frames into the current one. Thus vectors $d_{n-1,n}(x)$ can be mapped to become the candidate for forward motion at site $x + d_{n-1,n}(x)$ in frame n. Similarly for n−1. Of course using this projection idea implies that not all the sites in frame n get hit with the same number of temporal candidates. Nevertheless at most sites in n temporal candidates will result. FIGS. 6 and 7 show this possibility.

This set of vectors (the initial 10 and the additional temporal candidates if they exist) is then pruned to remove repeated vectors, or those that are closer together than $v_1$ pixels in length. $v_1 = 0.1$ is preferred. Two sets are generated $v_b^c$ and $v_c^f$ for backward and forward motion.

2. The candidate sets are combined to create candidate pairs. Thus if there are $N_b$ backward and $N_f$ forward candidates for motion, there are $N_c = N_b \times N_f$ pairs of combinations.

3. With each of the $N_c$ candidate pairs, there are 4 possibilities for occlusion states s. Thus $4N_c$ candidates are created by associating every candidate motion pair with 4 of the occlusion candidates.

4. For each candidate $v_c = [d_{n,n-1}^c, d_{n,n+1}^c, s^c]$ the following energies or log-probabilities are calculated.

$$E_1(v_c) = \begin{cases} \dfrac{[I_n(x) - I_{n-1}(x+d_{n,n-1}^c)]^2 + [I_n(x) - I_{n+1}(x+d_{n,n+1}^c)]^2}{2\sigma_e^2} & s^c = 00 \\ \dfrac{[I_n(x) - I_{n-1}(x+d_{n,n-1}^c)]^2}{2\sigma_e^2} + \beta & s^c = 01 \\ \dfrac{[I_n(x) - I_{n+1}(x+d_{n,n+1}^c)]^2}{2\sigma_e^2} + \beta & s^c = 10 \\ 2\beta & s = 11 \end{cases}$$

-continued $$E_2(v_c) = \Lambda \sum_{p_j \in N, j=1:8} \lambda_j f(|d^c_{n,n-1} - d_{n,n-1}(p_j)|) + \Lambda \sum_{p_j \in N, j=1:8} \lambda_j f(|d^c_{n,n+1} - d_{n,n+1}(p_j)|)$$

$$E_3(v_c) = \Lambda \sum_{p_j \in N, j=1:8} \lambda_j (s^c \neq s(p_j))$$

$$E_4(v_c) = \begin{cases} \frac{1}{2\sigma_d^2}|d^c_{n,n-1} + d_{n-1,n}(x+d^c_{n,n-1})|^2 + |d^c_{n,n+1} + d_{n+1,n}(x+d^c_{n,n+1})|^2 & s=00 \\ \frac{1}{2\sigma_d^2}|d^c_{n,n-1} + d_{n-1,n}(x+d^c_{n,n-1})|^2 + \beta_1 & s=01 \\ \frac{1}{2\sigma_d^2}|d^c_{n,n+1} + d_{n+1,n}(x+d^c_{n,n+1})|^2 + \beta_1 & s=10 \end{cases}$$

5. The total energy is then calculated as $E(v_c)=E_1(v_c)+E_2(v_c)+E_3(v_c)+E_4(v_c)$ 6. The configuration $v_c$ that gives the least energy $E(v_c)$ over all the candidates is selected as the solution at that site.

1.3.1 Iterations and Scanning

Figure 8:
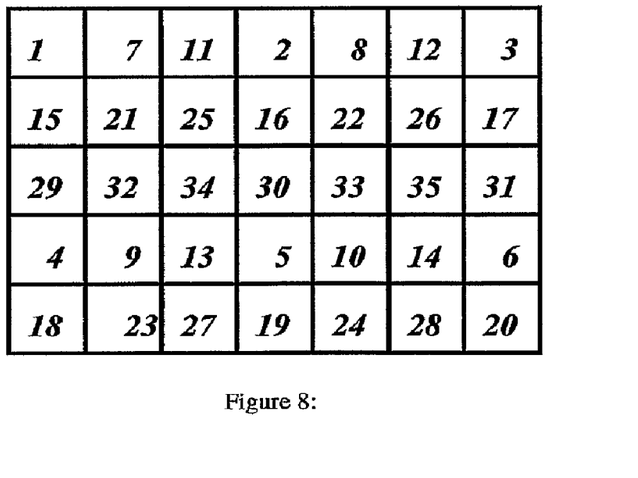
FIG. 8: An image of 5×7 pixels showing the sequence in which pixel sites are visited for estimating motion and occlusion using a checkerboard scan.

In practice a number of iterations of the algorithm above are used over the whole image. However, in each iteration over the image, it is advantageous to avoid scanning consecutive pixels. This would reuse neighbourhoods that overlap and it likely to propagate errors. Many alternative scan patterns can be used. A checkerboard scan pattern is preferred here. This is shown in FIG. 8. The process terminates when either there is no change of the vector and occlusion solution during an iteration anywhere in the image, or when the iterations exceed a maximum amount. 10 is a preferred maximum number of iterations.

In addition, and particularly for offline film postproduction and fluid flow tracking applications, multiple passes over the entire sequence are advantageous. These passes are useful particularly when the temporal smoothness prior as for instance specified in equation 13.

1.3.2 Multiresolution

Figure 2:
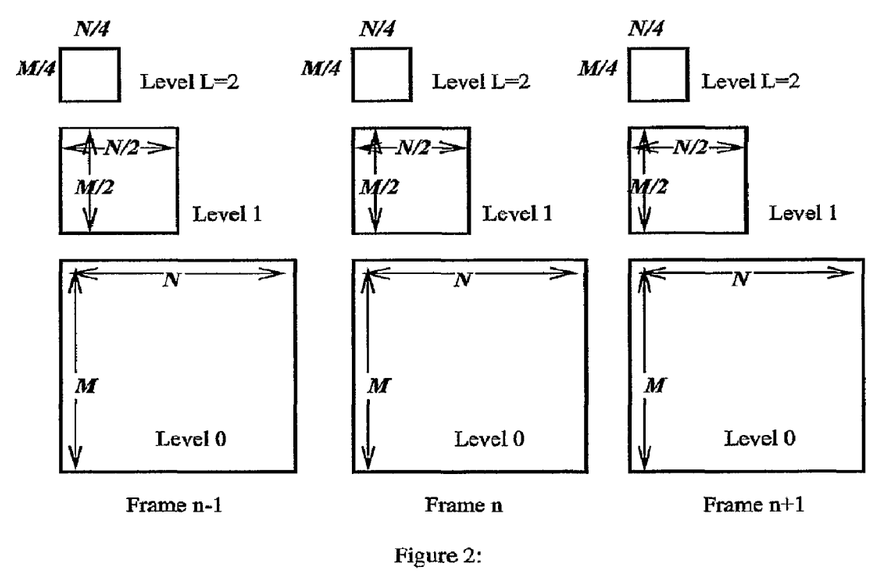
FIG. 2: The three frames n−1, n, n+1 are shown together with their reduced size versions forming the multiresolution pyramid required. Motion estimation begins at level 2 in this case and then propagated and successively refined at each level until the final, original resolution level is processed and termination is achieved.

This process is repeated at each image resolution level. To initialise motion and occlusion information at a level L given termination at level L−1 it is necessary to upsample the motion and occlusion field by a factor of 2. This is done by zero-order hold, i.e. at a site x in level L, the initial motion information comes from the site x/2 in level L−1, rounded to the nearest pixel. See FIG. 2 for an indication of the multiresolution creation. This step is denoted block (4) in FIG. 4.

1.3.3 Blocks and Pixels

The algorithm described here can operate on either a block or pixel basis. All the pixel wise operations disclosed above can be implemented on a block basis instead. Vector differences are then calculated between vectors specified on a block rather than a pixel grid. It is further computationally attractive to postpone the pixel assignment step till the final resolution level L=0. In that case, occlusion information is ignored at previous levels (i.e. s=00 everywhere), and only estimated at level L=0.

This is the preferred configuration for this process. It is denoted block (3) in FIG. 4.

1.3.4 Ignoring User Specified Regions

In the postproduction community it is common to find a situation in which part of the image is known to contain content that is not important for motion estimation. This also occurs in MPEG4 in which for a certain object, the requirement is to estimate the motion of that object, ignoring the motion of the image material around it. In the postproduction scenario the requirement to ignore certain image regions arises particularly when views are to be interpolated between a given set of images representing different camera view angles, or taken at different times. A process called inbetweening. In that scenario it is sometimes necessary to estimate motion of different objects separately, and the user may specify the location of the object manually. In MPEG4 the notion is that each object should have its own associated motion that is compressed separately from the motion of the rest of the objects in the image.

In both cases the motion estimation problem is therefore accompanied by some kind of mask information. The mask is an image that is the same size as the images being handled. The values at pixels in the mask are set to 1 where the corresponding image pixel is to be considered and set to 0 where the image pixel is to be ignored. Denote this mask or weights image corresponding to frame n as $W_n$. The value of the pixels in this image are at most 1 and at least 0. Their values may occupy a continuum of values inbetween or be binary. This weight information can be incorporated into the invention disclosed here in order to estimation motion and occlusion only for the user specified regions in the mask.

The modification required is to weight the interframe difference measurements in equations 10 and 13 using the values $W_{n-1}$, $W_{n-1}$, $W_{n-1}$. The weights therefore allow interframe differences to be ignored at mask boundaries, in which case the spatial motion and occlusion smoothness constraints will dominate. To be explicit, the energy evaluations disclosed above are replaced with the following.

$$E_1(v_c) = \begin{cases} \frac{w_n w'_{n-1}[I_n(x)-I_{n-1}(x+d^c_{n,n-1})]^2 + w_n w'_{n+1}[I_n(x)-I_{n+1}(x+d^c_{n,n+1})]^2}{2\sigma_e^2} + \beta(1-w_n w'_{n-1})' + \beta(1-w_n w'_{n+1})' & s^c=00 \\ \frac{w_n w'_{n-1}[I_n(x)-I_{n-1}(x+d^c_{n,n-1})]^2}{2\sigma_e^2} + \beta(2-w_n w'_{n-1}) & s^c=01 \\ \frac{w_n w'_{n+1}[I_n(x)-I_{n+1}(x+d^c_{n,n+1})]^2}{2\sigma_e^2} + \beta(2-w_n w'_{n+1}) & s^c=10 \\ 2\beta & s=11 \end{cases}$$

$$E_2(v_c) = \Lambda \sum_{p_j \in N, j=1:8} \lambda_j w_n w_n(p_j) f(|d_{n,n-1}^c - d_{n,n-1}(p_j)|) + \Lambda \sum_{p_j \in N, j=1:8} \lambda_j w_n w_n(p_j) f(|d_{n,n+1}^c - d_{n,n+1}(p_j)|)$$

$$E_3(v_c) = \Lambda \sum_{p_j \in N, j=1:8} \lambda_j w_n w_n(p_j)(s^c \neq s(p_j))$$

$$E_4(v_c) = \begin{cases} \frac{1}{2\sigma_d^2}(w_n w'_{n-1}|d_{n,n-1}^c + d_{n-1,n}(x+d_{n,n-1}^c)|^2 + w_n w'_{n+1}|d_{n,n+1}^c + d_{n+1,n}(x+d_{n,n+1}^c)|^2) + \beta(1-w_n w_{n-1})'\beta(1-w_n w_{n-1})' + \beta(1-w_n w_{n+1})' & s = 00 \\ \frac{1}{2\sigma_d^2} w_n w'_{n-1}|d_{n,n-1}^c + d_{n-1,n}(x+d_{n,n-1}^c)|^2 + \beta_1(2-w_n w'_{n-1}) & s = 01 \\ \frac{1}{2\sigma_d^2} w_n w'_{n+1}|d_{n,n+1}^c + d_{n+1,n}(x+d_{n,n+1}^c)|^2 + \beta_1(2-w_n w'_{n+1}) & s = 10 \end{cases}$$

Here $w'_{n-1} = w_{n-1}(x+d_{n,n-1}^c)$, and $w'_{n,n-1} = w_{n+1}(x+d_{n,n+1}^c)$. In other words, (•)' indicates motion compensation in the previous or next frame.

Note again that $w_n$ need not contain binary values only.

1.4 Hardware Implementation

This process can be implemented in hardware using FPGA arrays, and a CPU controller. More interestingly, recognise that it is the interframe differences and intervector differences that consume most of the compute activity in this process. The Graphics Processing Unit (GPU) in a general purpose PC can perform such operations at a much higher rate than the CPU. To exploit the GPU, it is required to export to the GPU memory the image frames, the current motion vector fields, and occlusion information. This data can be held in p-buffers on the GPU. Computational efficiency is achieved by exploiting the checkerboard scan at each iteration of the process. Consider FIG. 8. Pixels 1, 2, 3, 4, 5, 6 can all be processed at the same time since the energy calculations there employ independent and non-overlapping spatial information. After that is done, the other interleaved checkerboard 7, 8, 9, 10 of sites can then be processed simultaneously, and so on. This kind of parallel operation is possible on the GPU by exploiting the vertex and fragment programming facility built into the GPU cores by manufacturers such as ATI and NVIDIA.

What is claimed is:

1. A method of estimating motion and occlusion at a current site in a current frame from a video stream having three or more frames, the method comprising:
   identifying a plurality of motion vector candidates for each of a forward direction and a backward direction, the identification of at least some motion vector candidates performed at a block level, a pixel level, or a combination thereof using the steps of:
      initializing the motion vector candidate, and
      updating and refining the motion vector candidate, the updating using a measure of ill-conditioning of a gradient based estimation of the motion vector candidate and the refining using one or more update energies based on interframe difference, spatial motion correlation, and temporal motion correlation;
   generating a plurality of candidate pairs, each candidate pair in the plurality of candidate pairs having a forward motion vector from the plurality of motion vector candidates for the forward direction and a backward motion vector from the plurality of motion vector candidates for the backward direction and a occlusion state vector having a forward occlusion state and a backward occlusion state;
   determining an energy for at least some of the plurality of candidate pairs using a processor by jointly evaluating the forward motion vector and the backward motion vector of at least some of the plurality of candidate pairs based on interframe difference, spatial motion correlation, temporal motion correlation, and spatial occlusion correlation; and
   estimating motion and occlusion for the current site by selecting a candidate vector from the plurality of candidate vectors based on the determined energies.

2. A method of estimating motion and occlusion between three or more frames in a video stream, the method comprising:
   (i) identifying a plurality of motion vector candidates for each of a forward direction and a backward direction;
   (ii) generating a plurality of candidate pairs, each candidate pair in the plurality of candidate pairs having a forward motion vector from the plurality of motion vector candidates for the forward direction and a backward motion vector from the plurality of motion vector candidates for the backward direction;
   (iii) determining an energy for at least some of the plurality of candidate pairs using a processor by jointly evaluating the forward motion vector and the backward motion vector of at least some of the plurality of candidate pairs based on interframe difference, spatial motion correlation, temporal motion correlation, and spatial occlusion correlation; and
   (iv) estimating motion and occlusion between the three or more frames by selecting a candidate vector from the plurality of candidate vectors based on the determined energies.

3. The method of claim 2, wherein each candidate pair includes an occlusion state vector having a forward occlusion state and a backward occlusion state.

4. The method of claim 3, wherein the temporal motion correlation is expressed using a difference between the motion vectors in a candidate pair having an occlusion state vector that indicates no occlusion in either the forward or backward directions.

5. The method of claim 2, wherein identifying a motion vector candidate of the plurality of motion vector candidates with respect to a site in a frame of the plurality of frames comprises the steps of:
   (a) initializing the motion vector candidate;
   (b) updating the motion vector candidate; and
   (c) refining the motion vector candidate.

6. The method of claim 5, wherein steps (b) and (c) are performed using an iterative process having a plurality of iterations and the updating of the motion vector candidate is based on either a regularized solution or a singular value decomposition solution selected based on a measure of ill-conditioning of a gradient based estimation of the motion vector candidate.

7. The method of claim 6, wherein the iterative process of identifying the motion vector candidate is stopped using at least one of the following tests:
a sum squared prediction error vector related to motion compensated interframe differences is less than a threshold estimated according to an adaptive method that employs a histogram of the zero-motion interframe differences;
there is no significant gradient at the current site in the previous or next frame;
a magnitude of the updates to the motion vector estimates in a current iteration is less than a threshold; or
a count of the iterations exceeds a maximum allowed.

8. The method of claim 6, wherein refining the motion vector candidate comprises:
generating a plurality of update motion vector candidates based on the motion vector candidate;
determining an update energy for at least some of the plurality of update motion vector candidates based on interframe difference, spatial motion correlation, and temporal motion correlation;
refining the motion vector candidate using a update motion vector candidate from the plurality of update motion vector candidates based on the determined update energies.

9. The method of claim 8, wherein the site is a pixel in a current block, the steps (a), (b), and (c) are performed at a block level and identifying a motion vector candidate of the plurality of motion vector candidates with respect to the site further comprises:
selecting a set of pixel candidate vectors from the current block and its nearest neighbors;
measuring a prediction error for each of the pixel candidate vectors for each pixel in the current block; and
identifying the motion vector candidate as the pixel candidate vector having the smallest prediction error for that pixel.

10. The method of claim 6, wherein the iterative process is performed starting with a coarser resolution view of the plurality of frames in a first iteration and continuing using progressively finer resolution views of the plurality of frames.

11. The method of claim 10, wherein the iterative process includes deriving motion vector candidates for one or more pixels or blocks in one iteration from motion vector candidates for one or more blocks in a previous iteration based on a prediction error at the finer resolution.

12. The method of claim 2, wherein the method is for estimating motion from a current site in a current frame of one of the frames and identifying the plurality of motion vector candidates for the forward or backward directions comprises:
identifying at least one of the plurality of motion vector candidates from a surrounding region;
identifying at least one of the plurality of motion vector candidates based on the current site; and
identifying at least one of the plurality of motion vector candidates based on a most common vector in a block surrounding the current site;
wherein the motion vector candidates are created by projecting motion from a previous frame or a next frame into the current frame.

13. The method of claim 12, wherein the surrounding region includes the eight nearest neighbors of the current site.

14. The method of claim 12, wherein identifying the plurality of motion vector candidates for the forward or backward directions further comprises:
pruning the plurality of motion vector candidates by removing repeated motion vector estimates that are within a closeness threshold.

15. The method of claim 2, wherein the spatial motion correlation is expressed using a robust functional $f(\cdot)$ in which the output of $f(\cdot)$ is indicative of whether there is an edge between a current site and a neighborhood site.

16. The method of claim 2, wherein the spatial occlusion correlation is expressed by a comparison of estimated occlusion between a current site and sites from a surrounding region.

17. The method of claim 2, wherein estimating motion and occlusion is performed for only a portion of the one or more of the frames based on a weighting image.

18. The method of claim 2, wherein steps (i)-(iv) are performed for a plurality of sites within a current frame according to a checkerboard scanning pattern.

19. The method of claim 2, wherein determining the energy is based on a sum of the following energy functions or one or more derivations thereof:

$$E_1(v_c) = \begin{cases} [I_n(x) - I_{n-1}(x+d_{n,n-1}^c)]^2 + \\ \dfrac{[I_n(x) - I_{n+1}(x+d_{n,n+1}^c)]^2}{2\sigma_e^2} & s^c = 00 \\ \dfrac{[I_n(x) - I_{n-1}(x+d_{n,n-1}^c)]^2}{2\sigma_e^2} + \beta & s^c = 01 \\ \dfrac{[I_n(x) - I_{n+1}(x+d_{n,n+1}^c)]^2}{2\sigma_e^2} + \beta & s^c = 10 \\ 2\beta & s^c = 11 \end{cases}$$

$$E_2(v_c) = \Lambda \sum_{p_j \in N, j=1:8} \lambda_j f(|d_{n,n-1}^c - d_{n,n-1}(p_j)|) +$$

$$\Lambda \sum_{p_j \in N, j=1:8} \lambda_j f(|d_{n,n+1}^c - d_{n,n+1}(p_j)|)$$

$$E_3(v_c) = \Lambda \sum_{p_j \in N, j=1:8} \lambda_j (s^c \neq s(p_j))$$

$$E_4(v_c) = \begin{cases} \dfrac{1}{2\sigma_d^2} \begin{array}{l} |d_{n,n-1}^c + d_{n-1,n}(x+d_{n,n-1}^c)|^2 + \\ |d_{n,n+1}^c + d_{n+1,n}(x+d_{n,n+1}^c)|^2 \end{array} & s^c = 00 \\ \dfrac{1}{2\sigma_d^2}|d_{n,n-1}^c + d_{n-1,n}(x+d_{n,n-1}^c)|^2 + \beta_1 & s^c = 01 \\ \dfrac{1}{2\sigma_d^2}|d_{n,n+1}^c + d_{n+1,n}(x+d_{n,n+1}^c)|^2 + \beta_1 & s^c = 10; \end{cases}$$

wherein:
$E_1(v_c)$, $E_2(v_c)$, $E_3(v_c)$, and $E_4(v_c)$ are energy functions;
$s^c$ is an occlusion state vector of the current site;
$I_n(x)$ is the value at site x and frame n;
$I_{n-1}(x+d_{n,n-1}^c)$ is the value at frame n−1 of the site defined by site x and motion vector $d_{n,n-1}^c$;
$I_{n+1}(x+d_{n,n+1}^c)$ is the value at frame n+1 of the site defined by site x and motion vector $d_{n,n+1}^c$;
β is a constant used as a hypothesis check on outliers;
$\sigma_e^2$ is a variance of e(x), e(x) being an assumed sample from a Gaussian distribution with a mean=0;
Λ is a variable that controls the overall smoothness strength;

j is an identifier of sites in the surrounding region around the site x being estimated;

$\lambda_j$ is a pre-determined constant;

$f(\bullet)$ is any robust function;

$d_{n,n-1}$ is a motion vector between the previous frame and the current frame;

$p_j$ is a position vector for site j;

$s(p_j)$ is the occlusion state vector of $p_j$;

$\sigma_d^2$ is a pre-determined constant controlling the match between motion expected in time; and $\beta_1$ is a constant used as a hypothesis check on outliers.

20. A computing device configured for estimating motion and occlusion between three or more frames in a video stream, the computing device comprising:

a memory; and a processor configured to execute instructions stored in the memory to:

(i) identify a plurality of motion vector candidates for each of a forward direction and a backward direction;

(ii) generate a plurality of candidate pairs, each candidate pair in the plurality of candidate pairs having a forward motion vector from the plurality of motion vector candidates for the forward direction and a backward motion vector from the plurality of motion vector candidates for the backward direction;

(iii) determine an energy for at least some of the plurality of candidate pairs by jointly evaluating the forward motion vector and the backward motion vector of at least some of the plurality of candidate pairs based on interframe difference, spatial motion correlation, temporal motion correlation, and spatial occlusion correlation; and (iv) estimate motion and occlusion between the three or more frames by selecting a candidate vector from the plurality of candidate vectors based on the determined energies.

\* \* \* \* \*